United States Patent
McNerney et al.

(10) Patent No.: US 7,509,976 B2
(45) Date of Patent: Mar. 31, 2009

(54) MULTI-PORT DIVERTER VALVE

(75) Inventors: Gerald J. McNerney, Carmel, IN (US); Garry Robin Marty, Fishers, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 1180 days.

(21) Appl. No.: 10/386,267

(22) Filed: Mar. 11, 2003

(65) Prior Publication Data

US 2004/0177889 A1 Sep. 16, 2004

(51) Int. Cl.
*F16K 11/085* (2006.01)
(52) U.S. Cl. .............................. 137/625.11; 137/625.47
(58) Field of Classification Search ............ 137/625.11, 137/625.12, 625.15, 625.47
See application file for complete search history.

(56) References Cited

U.S. PATENT DOCUMENTS

| | | | | |
|---|---|---|---|---|
| 1,228,469 A | * | 6/1917 | Mueller | 137/625.11 |
| 2,830,564 A | * | 4/1958 | Bryant | 137/625.11 |
| 3,076,478 A | * | 2/1963 | Winders | 137/625.11 |
| 3,206,926 A | * | 9/1965 | Lockwood | 137/625.11 |
| 4,403,626 A | * | 9/1983 | Paul, Jr. | 137/625.15 |
| 4,574,842 A | * | 3/1986 | Cordova | 137/625.15 |
| 4,632,148 A | * | 12/1986 | Stark et al. | 137/625.11 |
| 4,968,334 A | * | 11/1990 | Hilton | 137/625.47 |
| 5,272,992 A | * | 12/1993 | Barbour et al. | 137/625.11 |
| 6,196,266 B1 | * | 3/2001 | Breda | 137/625.11 |
| 6,367,504 B1 | | 4/2002 | Knapp | |
| 6,789,573 B2 | * | 9/2004 | Knapp | 137/625.15 |
| 6,799,604 B1 | * | 10/2004 | Samwell et al. | 137/625.11 |
| 2004/0050432 A1 | * | 3/2004 | Breda | 137/625.11 |

FOREIGN PATENT DOCUMENTS

GB      2 345 950      * 7/2000

* cited by examiner

*Primary Examiner*—John Rivell
(74) *Attorney, Agent, or Firm*—Leon E. Redman; Carlson, Gaskey & Olds

(57) ABSTRACT

A valve assembly includes a housing that defines a fluid inlet and three outlets. A cartridge defining a fluid chamber includes an inlet boss that is inserted within an inlet port. The cartridge includes outlet seats engagable with any one or a combination of two outlet ports. Rotation of the cartridge selectively engages the outlet seats with any one or combination of two outlet ports. A cap retains the cartridge within the bore and is moveable between a first position that holds the cartridge in fluid communication with the inlet port to direct the fluid to specific designated outlet ports and a second position where the cartridge is free from the inlet port and allows fluid flow between the inlet port and all of the outlet ports independent of the cartridge assembly.

18 Claims, 6 Drawing Sheets

MULTI-PORT DIVERTER VALVE

BACKGROUND OF THE INVENTION

This invention relates generally to a diverter valve for directing water from a mixing valve to a number of separate outlets and specifically to a diverter valve capable of directing fluid to a specific combination of hydraulic devices.

Typically, a diverter valve is commonly assembled between a flow control device or valve such as a mixing faucet and several hydraulic devices. One common example is the use of a mixing valve for a shower and tub combination. The mixing valve provides proportional quantities of hot and cold fluids. The diverter valve is actuated to provide fluid to desired hydraulic device such as the spout for the bathtub or the showerhead. In some versions of the diverter valve is capable of diverting fluid to one of several hydraulic devices. Diverter valves commonly have a valve cartridge rotatable about an axis to provide selective fluid communication between an inlet and one of a several outlets.

It is becoming increasingly common to increase the number of showerheads or other hydraulic devices available for use within a shower. Typically, if more than one hydraulic device is installed, separate on/off valves are required to control the flow of fluid to each hydraulic device. It is known to install multiple showerheads within a shower to provide many streams of continuous and directed water flow. In such assemblies many valves are required in order to selectively engage or disengage water flow through specific showerheads. Installation of such valves increases cost, complexity and installation time. The added expense is a barrier to installing multiple showerheads in many applications where cost is of concern.

Accordingly, it is desirable to develop a multi-port diverter valve capable of directing fluid from an inlet to a multiple hydraulic outlet devices in various combinations.

SUMMARY OF THE INVENTION

An embodiment of this invention is a diverter valve assembly capable of directing fluid to any one or combination of two hydraulic devices.

The diverter valve assembly of this invention includes a cartridge disposed within a bore defined within a valve housing. The valve housing defines an inlet and at least two outlets. An inlet port and several outlet ports are disposed within the bore. A cartridge assembly is disposed within the bore and directs fluid from the inlet to the outlets. The outlet ports are arranged within the bore such that rotation of the cartridge assembly can direct fluid flow to one or any combination of two outlet ports.

The valve assembly includes a housing that defines a fluid inlet and at least two outlets. The cartridge assembly includes an inlet boss that extends into the inner diameter of an inlet port within the bore. The cartridge is rotatable within the bore by way of a stem extending from an upper portion of the cartridge. Rotation of the stem causes rotation of the cartridge within the bore of the housing that selectively directs fluid between the inlet and the various outlet ports. The specific configuration and layout of the outlet ports in relation to the outlets disposed within the cartridge assembly allows for any combination of two of the outlets to be and receive fluid from the inlet. Further, the cartridge assembly is also selectively rotatable to engage only one of the outlets as is desired by an operator.

Accordingly, the multi-port diverter valve of this invention provides, one valve assembly for controlling the fluid flow between multiple hydraulic devices in several desired combinations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
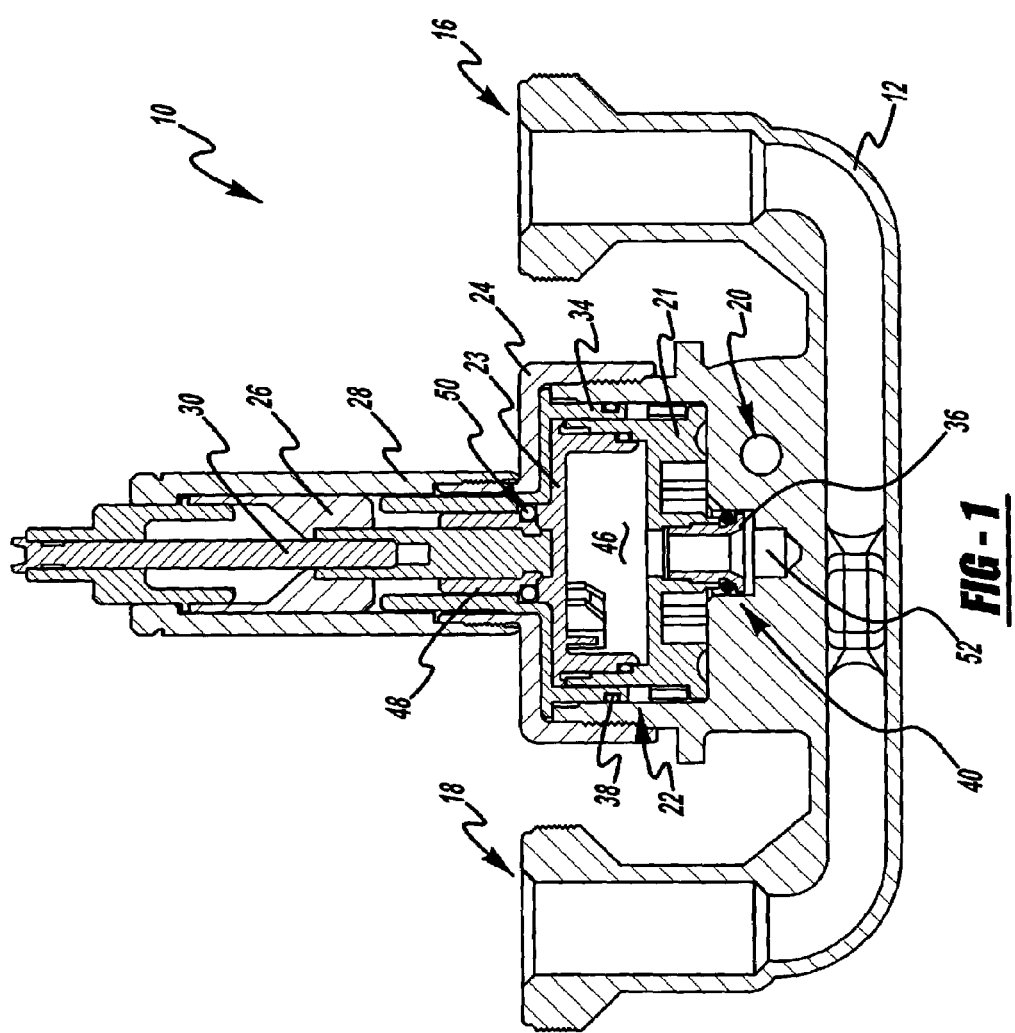
FIG. 1 is a cross sectional view of the multi-port diverter valve assembly.
Figure 2:
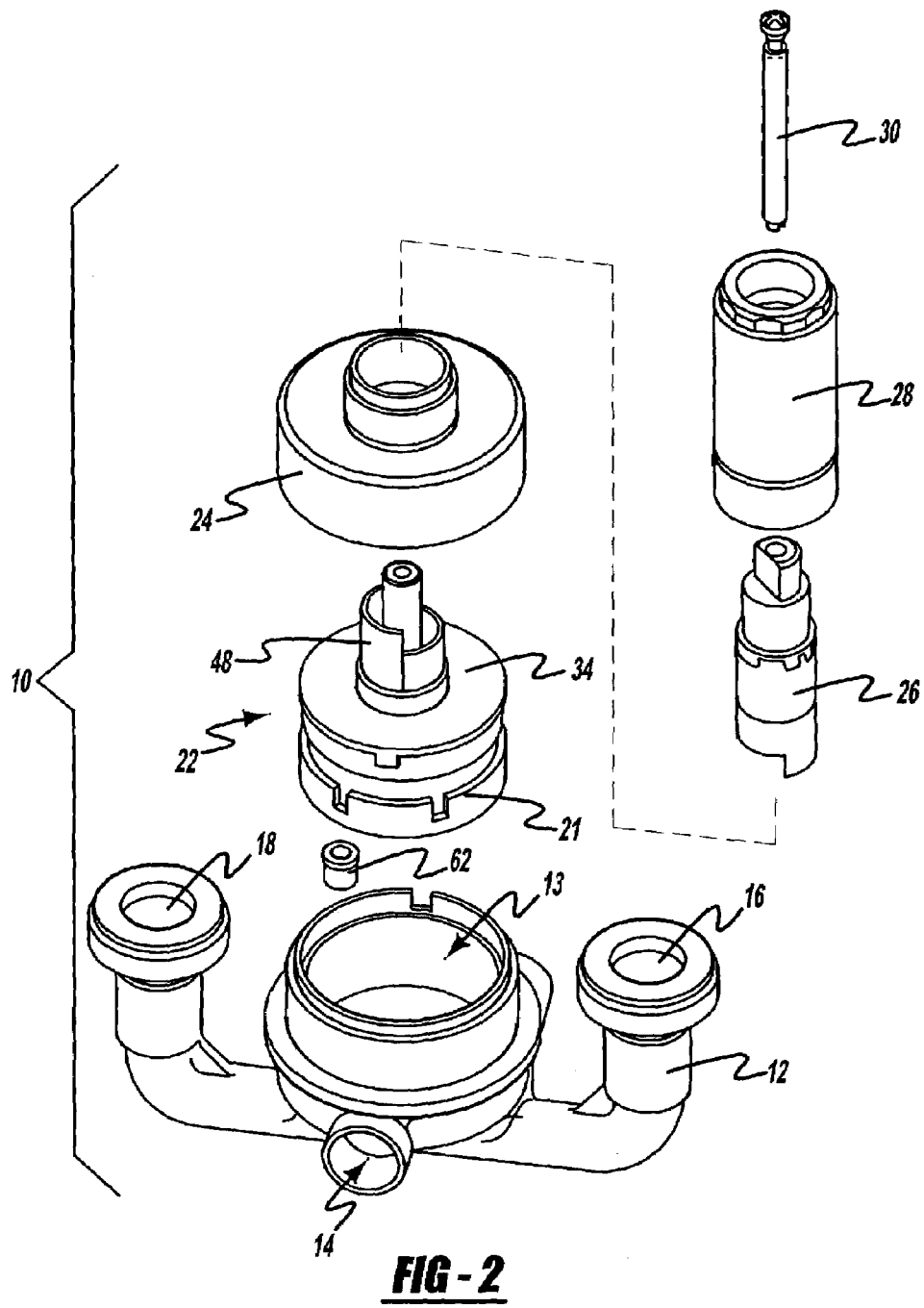
FIG. 2 is an exploded view of the multi-port diverter valve assembly.
Figure 4:
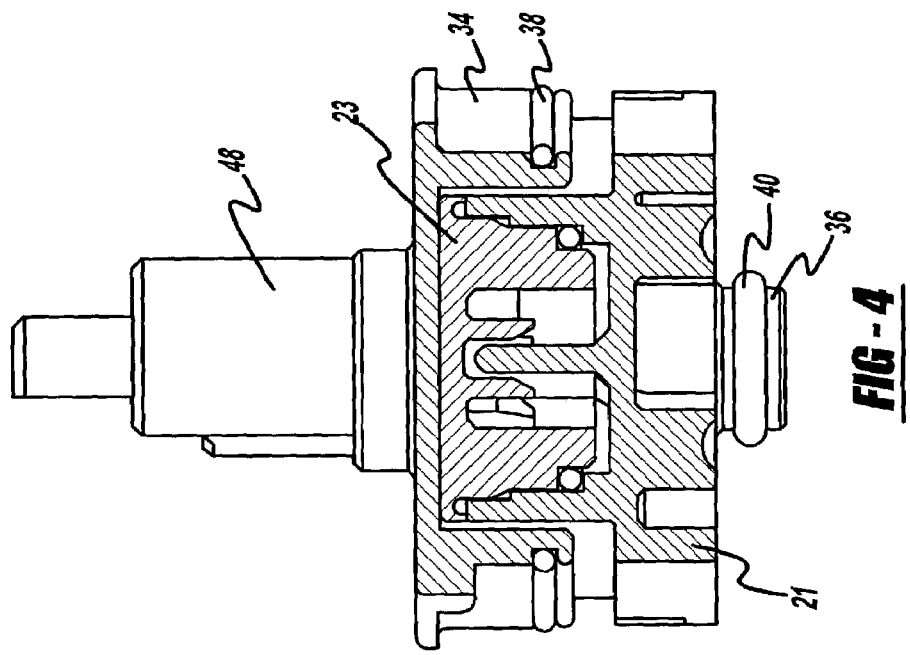
FIG. 4 is a cross sectional view of the cartridge assembly.
Figure 3:
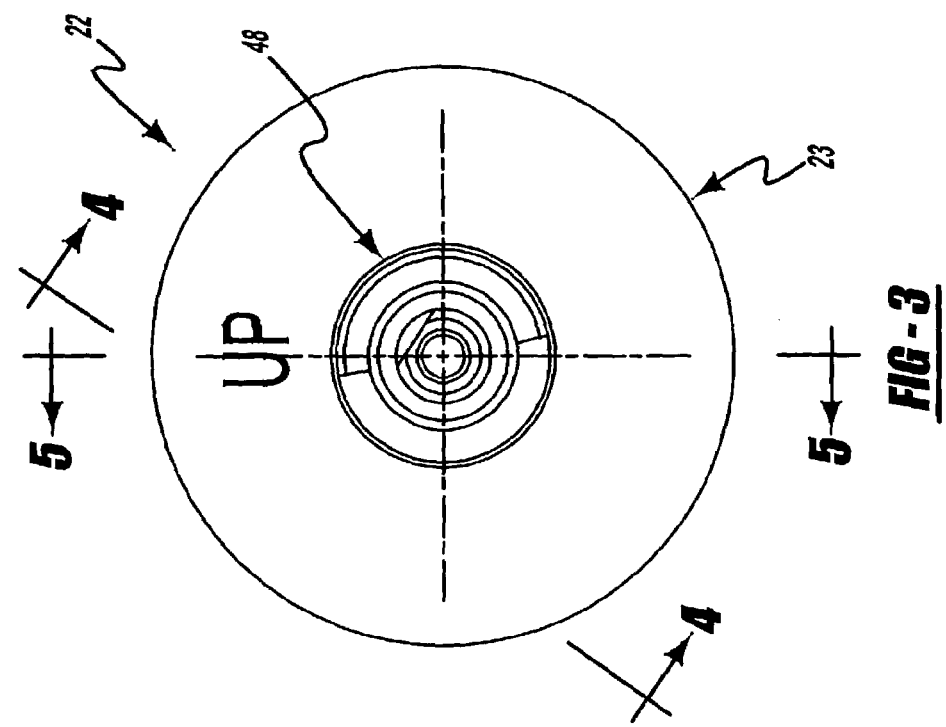
FIG. 3 is a top view of the cartridge assembly.

Referring to FIGS. 1 and 2, a multi-port diverter valve assembly 10 includes a valve body 12 defining an inlet 14 (best shown in FIG. 2) and outlets 16,18. The body 12 defines a bore 13 that houses a cartridge assembly 22. The cartridge assembly 22 comprises a lower cartridge portion 21 and an upper cartridge portion 23. The upper and lower cartridge portions 21,23 fit together to form a chamber 46. The chamber 46 is in fluid communication with inlet port 52 defined within the body 12. An inlet boss 36 extends from the cartridge assembly 22 into the inlet port 52. An o-ring 40 corresponds to an inner surface of inlet port 52 to provide sealing engagement.

The cartridge assembly 22 is held within the bore 13 against fluid pressure from the inlet port 52 by a cap 34. The cap 34 includes an o-ring 38 that seals the outer surface of the cap 34 against an inner surface of the bore 13. The cap 34 is stationary relative to the cartridge assembly 22. The cartridge assembly 22 is sealed against an inner surface of the cap 34 by o-ring 50. The o-ring 50 is disposed about stem portion 48 attached to the upper cartridge portion 23. The stem 48 extends upward through the cap portion 34. The cap 34 and cartridge assembly 22 are held within the bore 13 of the body 12 by a bonnet 24. The bonnet 24 includes threads that threadingly engaged threads that are disposed on an outer surface of the bore 13. A stem extender 26 is attached to the stem 48 and held in place by a retention screw 30. A sleeve 28 covers the stem 48 and stem extender 26, providing a pleasing cosmetic appearance.

Figure 7:
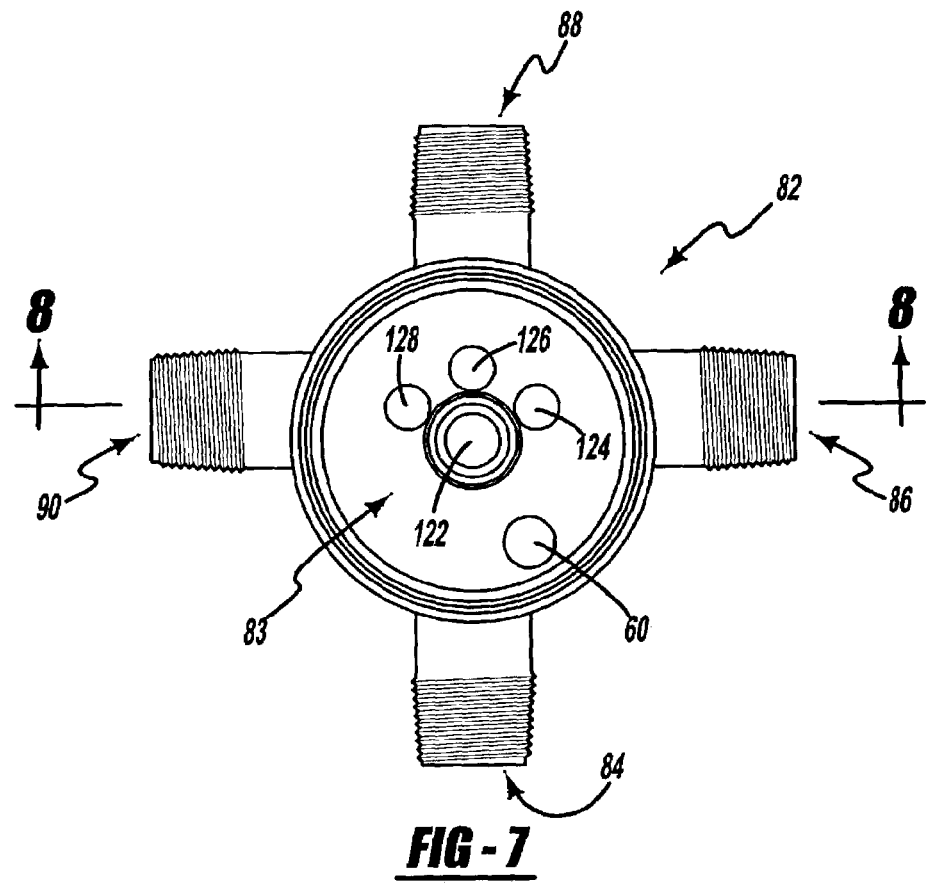
FIG. 7 is a top view of the body portion showing the inlet port and outlet ports.

Referring to FIG. 2 an exploded view of the valve assembly 10 is shown including the cartridge assembly 22 and bonnet 24. A detent 62 is shown and is assembled within the cartridge assembly 22 and corresponds with a detent surface 60 (as shown in FIG. 7). The detent 62 operates to provide a positive location feel of the cartridge assembly 22 with specific outlets.

Referring to FIGS. 3-5A, the cartridge assembly 22 includes the upper cup shaped portion 23 that is inserted within the cup shaped lower portion 21 to form the inner chamber 46. A seal is provided between the upper and lower portions 23 by o-ring 64. The inner chamber 46 fills with fluid by way of inlet boss 36. Inlet boss 36 extends below a lower surface of the lower cartridge 21 to engage the inner surface of the inlet port 52. Fluid flows from the inlet port 52 into the inner chamber 46 through outlet seats 44.

The outlet seats 44 are biased to create a sealing engagement within the lower surface of the bore 13 by way of biasing springs 42. Preferably, there are at least three outlet seats 44 within the cartridge assembly 22. The outlet seats 44 are constructed of a material that is durable to provide a sealing contact with the bottom surface of the bore 13. The outlet seats 44 correspond to specific outlet ports within the bore 13. Rotation of the cartridge assembly 22 provides selective fluid communication between the inlet port 52 and the various outlet ports depending on which of the outlet seats 44 are in communication with the outlet ports. Preferably any one or combination of two outlet ports can be in fluid communication with the inlet port 52 at any one time depending on the specific location of the cartridge assembly 22 as it is rotated within the bore 13. This provides for the supply of fluid to multiple hydraulic devices from a common inlet.

Figure 5A:
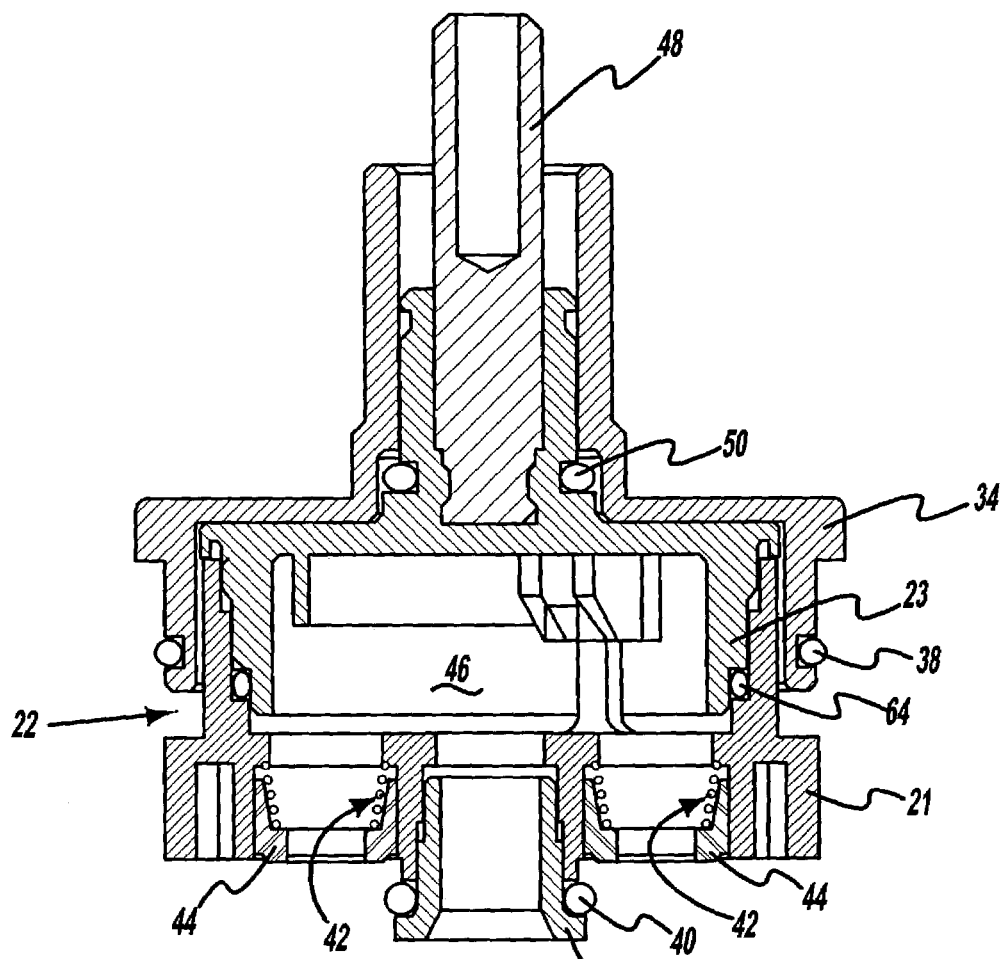
FIG. 5A is another cross sectional view of the cartridge assembly.
Figure 5B:
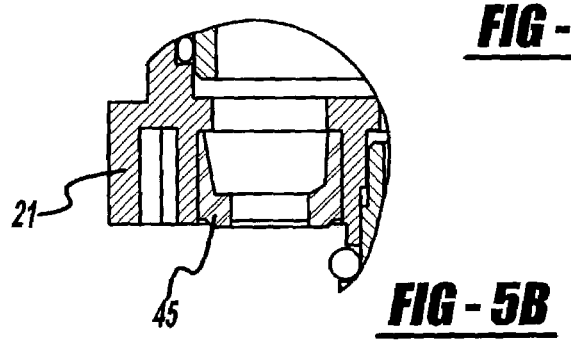
FIG. 5B is a cross sectional view of another embodiment of an outlet seat.

Referring to FIG. 5B, another embodiment of the cartridge assembly 22 includes a springless outlet seat 45. The outlet seat 45 is configured to seat within the outlets valve assembly and comprises a compliant material for biasing against the lower surface of the bore 13. The outlet seat 45 creates a seal with the bottom surface of the bore 13. The outlet seat 45 comprises a rubber material with a desired elasticity. The elasticity of the rubber provides the biasing force required to create the seal with the bottom surface of the bore 13.

In operation, a mixing valve is used to provide and supply fluid at a desired temperature. The diverter valve 10 is then selectively rotated to engage the specific outlet seats 44 with the specific outlet ports desired and corresponding to the hydraulic outlet devices. The outlet ports are arranged within the bore 13 such that any two outlet ports can be supplied with fluid from the inlet port 52 at any one time. Further, the cartridge assembly 22 may also be rotated within the bore 13 to engage any single outlet port corresponding to any one hydraulic device.

Figure 6:
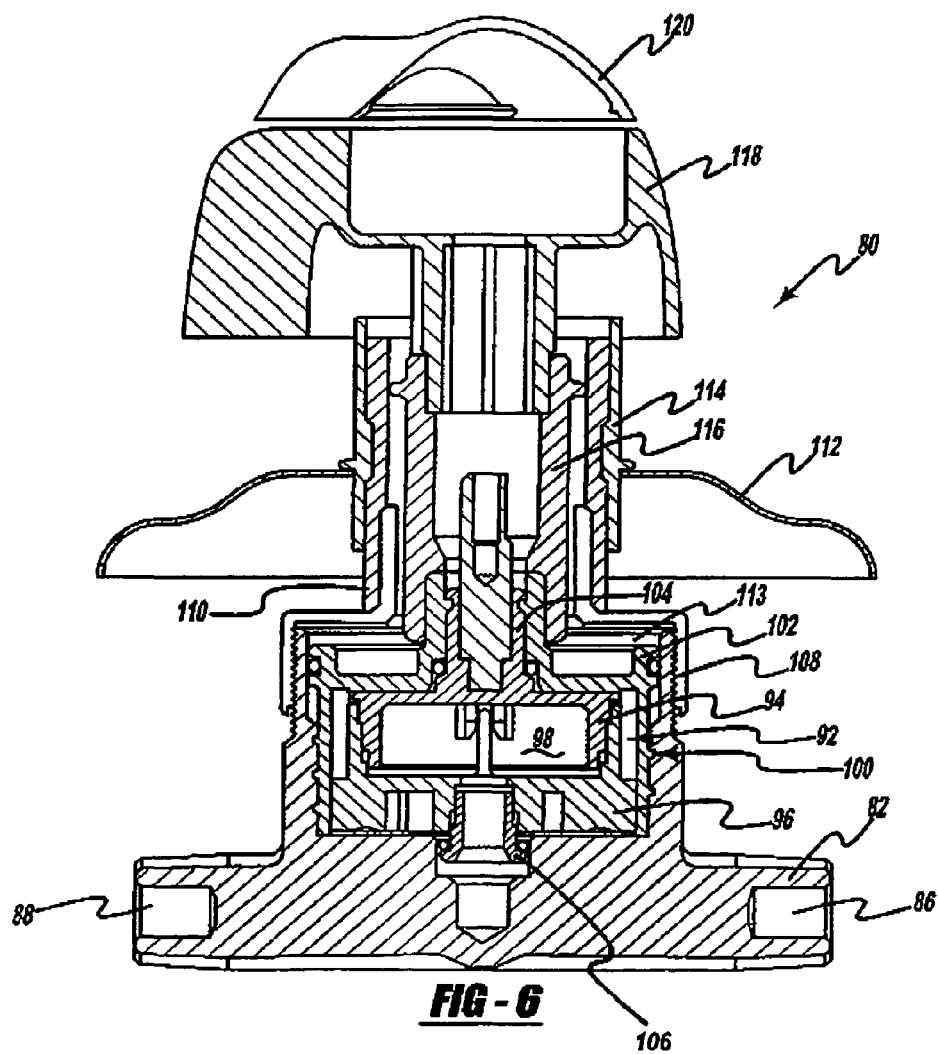
FIG. 6 is a cross sectional view of an alternate embodiment of the multi-port diverter valve assembly.
Figure 8:
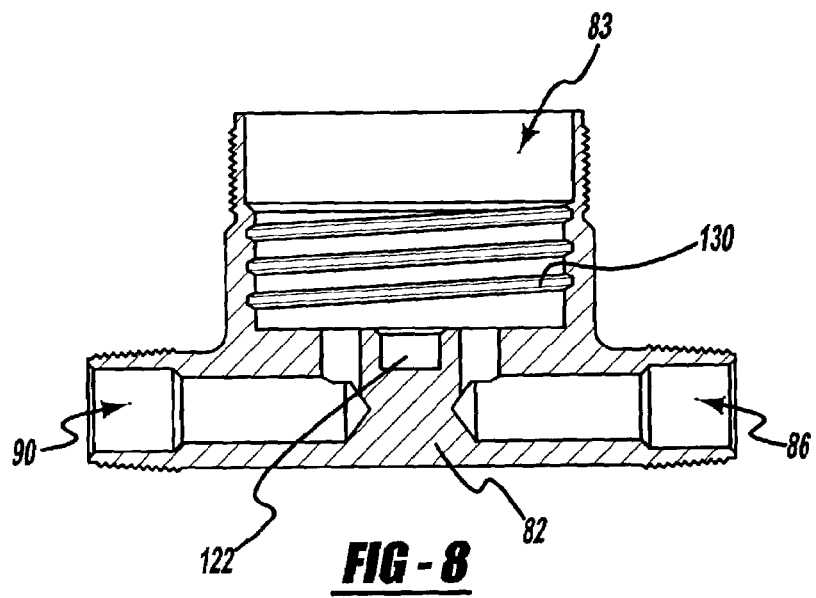
FIG. 8 is a cross sectional view of the body assembly showing the bore and accompanying internal threads.

Referring to FIGS. 6-8, another embodiment of the multi-port diverter valve assembly is generally indicated at 80 and includes a body portion 82 defining a bore 83. The bore 83 includes an inlet port 122 and outlet ports 124,126,128. The inlet port 122 corresponds to inlet 84. The outlet ports 124, 126,128 correspond with outlets 86,88,90. The ports are arranged about the inlet port 122.

The cartridge assembly 92 on this embodiment includes an upper portion 94 and a lower portion 96. The upper and lower portions 94,96 combine to form a fluid chamber 98. The fluid chamber is in fluid communication with the inlet port 122. The cartridge assembly 92 is held within the bore 13 by way of the cap 102. The cap 102 includes an external thread 100. The external thread 100 is preferably an Acme thread that allows the cap to be threaded out of the bore 83. The external thread 100 mates with corresponding threads 130 in the body 82. A bonnet 108 holds the cartridge assembly 92 and limits movement of the cap 102 within the bore 83. The cap 102 is threadingly engaged through the threads 130 of the bore 83. The specific pitch of the threads 100 are determined according to the desired amount of handle rotation required to attain the desired hydraulic communication.

The cap 102 is rotatable along the threads 100 between a first position where the inlet boss 106 is engaged and sealed within the inlet port 122 and a second position where the inlet boss 106 is unsealed and disengaged from the inlet port 122. An axial space 103 between the upper portion of the cap 102 and the bonnet 108 allows movement of the cap 102 to the second position where the inlet boss 106 is no longer in sealed engagement with the inlet port 122. Once the inlet boss 106 is no longer engaged with the inlet port 122, fluid is free to flow to any of the outlets 128,126,124 disposed within the bore 83.

In the multi-port diverter valve 80 of this embodiment, fluid can be selectively diverted to any single hydraulic device, any combination of two hydraulic devices, or all of the hydraulic devices. The cartridge assembly 92 includes the stem portion 104 that extends upward through the cap 102. The stem portion 104 is attached to a stem extender as in the first embodiment. The cap 102 also includes an outer sleeve 116. The outer sleeve 116 is attached to an outer handle 118. The inner sleeve 104 is movable by rotation of an inner handle 120.

In operation, movement of the handle 120 moves the cartridge assembly 92 to selectively engage any one or combination of two outlet ports to receive fluid flowing from the inlet port 122. Rotation of the handle 118 rotates the cap 102 and allows the cartridge assembly 92 to be forced upward out of the inlet port 122 such that fluid may flow to any of the outlets 124,126,128 disposed within the bore 83.

The mixing valve assembly 80 of this invention allows multiple hydraulic devices to be supplied with fluid at a common temperature that originates from a mixing valve without the use of multiple valve assemblies.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A valve assembly comprising:
   a housing defining a fluid inlet and at least two outlets, wherein said at least two outlets include non-adjacent outlets;
   a bore within said housing including an inlet port corresponding to said inlet and at least two outlet ports corresponding to said at least two outlets; and
   a cartridge defining a fluid chamber, rotatably disposed within said bore and including a boss in fluid communication with said inlet port, where said cartridge includes at least two outlet seats spaced a distance apart and in fluid communication with said chamber and selectively in fluid communication concurrently with non-adjacent ones of said at least two outlet ports depending upon a position of said cartridge.

2. The assembly of claim 1, wherein each of said outlet seats is biased into sealing contact with a surface of said bore.

3. The assembly of claim 1, wherein each of said outlet seats includes a biasing spring biasing said outlet seat into sealing contact with a surface of said bore.

4. The assembly of claim 1, including a cap having an outer surface in sealing contact with an inner surface of said bore, and an inner surface in scaling contact with said cartridge, said cartridge movable relative to said cap.

5. The assembly of claim 4, including a bonnet for holding said cap and said cartridge within said bore against fluid pressure from said inlet.

6. The assembly of claim 1, including a stem portion extending from said cartridge for rotating said cartridge such that said outlet seats are selectively placed in fluid communication with said at least two outlet ports.

7. The assembly of claim 6. including a stem extender engaged to said stem on a first end and a handle on a second end.

8. The assembly of claim 1, including three outlets, outlet ports, and outlet seats.

9. The assembly of claim 8, wherein said cartridge is movable to place any one of said outlet seats in fluid communication with a corresponding outlet port.

10. The assembly of claim 8, wherein said cartridge is movable to place any two of said outlet seats in fluid communication with corresponding outlet ports, such that fluid flow from said inlet flows to any two of said outlets.

11. The assembly of claim 1, wherein said cartridge includes an upper portion and a lower portion attached to form said fluid chamber.

12. The assembly of claim 1, further including a cap having threads engaged with threads on inner surface of said bore, to hold said cartridge and thereby said inlet boss in fluid communication with said inlet port.

13. The assembly of claim 12, including an outer sleeve portion attached to rotate said cap, said cap rotatable on said threads to allow said cartridge and thereby said inlet boss to move out of said inlet port to allow fluid communication from said inlet port to all of said outlet ports independent of said outlet seats.

14. The assembly of claim 12, wherein said threads ate further defined as Acme type threads.

15. The assembly of claim 4, including a sleeve portion covering for holding said stem in place and attached to said bonnet.

16. A valve assembly comprising:
 a housing defining at fluid inlet and at least two outlets that are disposed circumferentially non-adjacent relative to each other;
 a bore within said housing including an inlet port corresponding to said inlet and at least two outlet ports corresponding to said at least two outlets; and
 a cartridge defining a fluid chamber, rotatably disposed within said bore and including a boss in fluid communication with said inlet port, wherein said boss supports a seal that seals against an inner surface of said inlet port; and said cartridge includes at least two outlet seats spaced circumferentially apart and in fluid communication with said chamber and selectively in fluid communication concurrently with said circumferentially non-adjacent ones of said at least two outlet ports depending upon a position of said cartridge.

17. The valve assembly as recited in claim 16, wherein said cartridge is rotatable about an axis of rotation and said inlet is disposed about said axis of rotation.

18. The valve assembly as recited in claim 16, wherein said housing includes a bottom surface and said inlet and said at least two outlet ports are disposed within said bottom surface.

* * * * *